United States Patent [19]

Renken, Jr.

[11] 3,739,261
[45] June 12, 1973

[54] METHOD FOR MEASURING THE AMOUNT OF COLD WORKING IN A STAINLESS STEEL SAMPLE

[75] Inventor: Claus J. Renken, Jr., Holts Summit, Mo.

[73] Assignee: The United States of America as represented by the United States Atomic Energy Commission, Washington, D.C.

[22] Filed: June 28, 1971

[21] Appl. No.: 157,139

[52] U.S. Cl. ............................... 324/34 R, 324/37
[51] Int. Cl. .............................................. G01r 33/12
[58] Field of Search ..................... 324/34 R, 34 TK, 324/34 H, 34 PE, 37; 317/157.5

[56] References Cited
UNITED STATES PATENTS

| | | | |
|---|---|---|---|
| 2,659,857 | 11/1953 | Anderson | 324/34 R |
| 3,593,122 | 7/1971 | Barton | 324/37 |
| 2,758,276 | 8/1956 | Foerster | 324/34 R |
| 2,221,570 | 11/1940 | Brace et al | 324/37 |
| 2,295,382 | 9/1942 | Brace | 324/34 H |
| 3,617,874 | 11/1971 | Forster | 324/37 |

Primary Examiner—Robert J. Corcoran
Attorney—Roland A. Anderson

[57] ABSTRACT

The amount of cold working in a stainless steel sample is determined by magnetizing the stainless steel sample in a predetermined direction and mounting a magnetic-field-sensing apparatus in magnetic coupled relationship with the stainless steel sample. The stainless steel sample is then moved relative to the magnetic-field-sensing apparatus to modulate the magnetic coupling therebetween responsive to the relative motion and provide magnetic-field scanning of the sample. The signal sensed by the magnetic-field-sensing apparatus is filtered to pass only the modulation frequency of the magnetic coupling, which filtered sensed magnetic-field signal provides a measure of cold working in the stainless steel sample.

4 Claims, 8 Drawing Figures

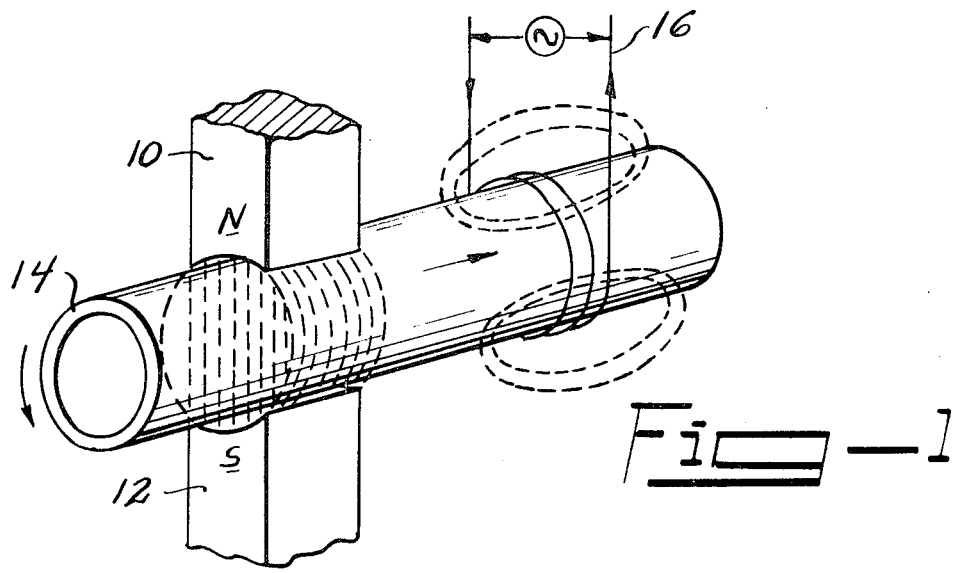
Fig-1
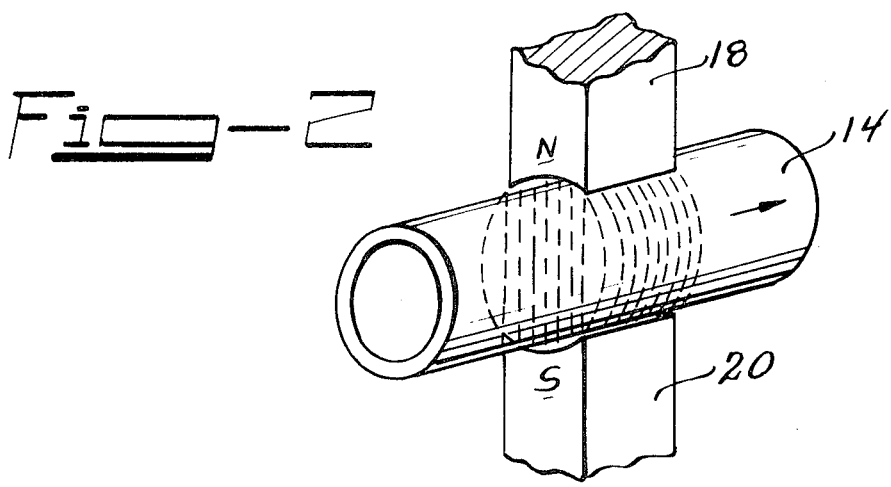
Fig-2
Fig-6
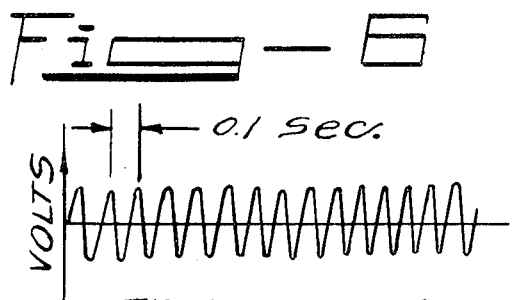
TIME OR TUBE POSITION
Inventor
Claus J. Renken Jr.
By: [signature]
Attorney

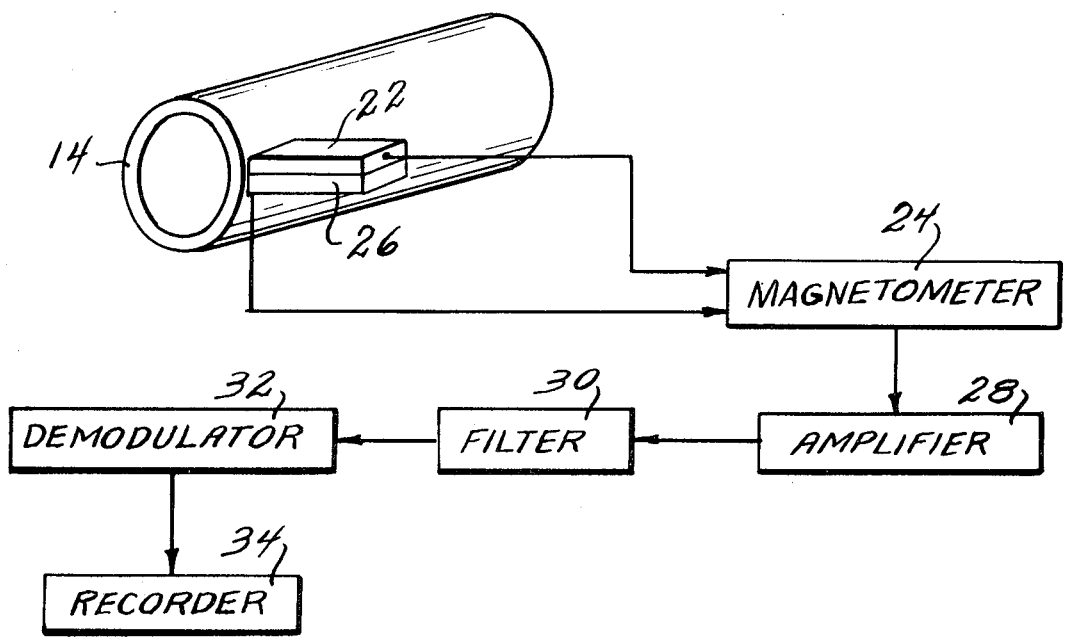
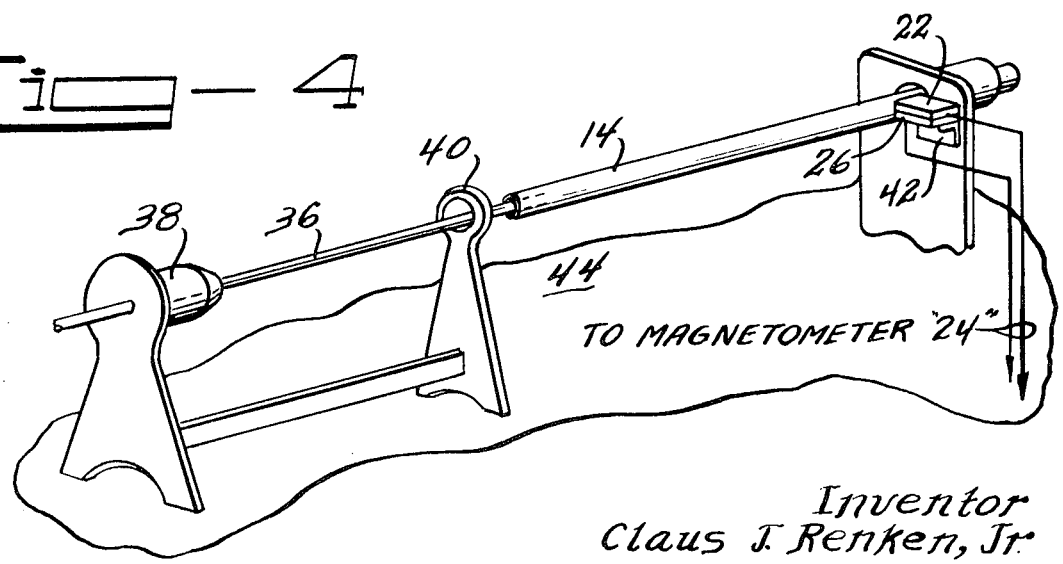

Inventor
Claus J. Renken, Jr.
By: [signature]
Attorney

METHOD FOR MEASURING THE AMOUNT OF COLD WORKING IN A STAINLESS STEEL SAMPLE

CONTRACTUAL ORIGIN OF THE INVENTION

The invention described herein was made in the course of, or under, a contract with the UNITED STATES ATOMIC ENERGY COMMISION.

BACKGROUND OF THE INVENTION

This invention relates to a nondestructive method for measuring the amount of cold working in a stainless steel sample.

Stainless steel is a material which enjoys wide commercial usage. During the manufacturing process of stainless steel, cold working can be occasioned in the material. It is desirable to know the amount of cold working in stainless steel for certain end uses of the material. For example, stainless steel tubing is used in nuclear reactors as jackets for reactor fuel elements. During operation of the reactor, undesired swelling of the stainless steel tubing may occur restricting the freedom of motion of the stainless-steel-jacketed fuel elements. It has been noted that the susceptibility of the stainless steel jacketing to swelling is related to the amount of cold working in the stainless steel tubing. Accordingly, it is desirable that the amount of cold working in a stainless steel tube be known before the tube is used as jacketing for nuclear fuels. Further, it is desirable that the amount of cold working in the stainless steel be ascertained nondestructively.

Accordingly, it is one object of the present invention to provide a method for measuring the amount of cold working in a stainless steel sample.

It is another object of the present invention to provide a method for non-destructively determining the amount of cold working in stainless steel material.

It is another object of the present invention to provide a sensitive, fast and simple method for measuring cold work in a stainless steel sample.

It is another object of the present invention to provide a method for measuring the magnetic property of a stainless steel sample to measure cold work therein.

It is another object of the present invention to provide a method for measuring retentivity in a stainless steel sample to measure cold work therein.

Other objects of the present invention will become more apparent as the general description proceeds.

In the practice of the present invention, the amount of cold working in a stainless steel sample is measured by magnetizing the stainless steel sample in a predetermined direction and mounting a magnetic-field-sensing apparatus in magnetic coupled relationship with the sample. The stainless steel sample is moved relative to magnetic-field-sensing apparatus to modulate the magnetic coupling between the sample and the apparatus responsive to the relative motion therebetween and provide magnetic-field scanning of the sample. The magnetic-field signal sensed by the apparatus is then filtered to pass only the modulation frequency of the magnetic coupling, which filtered signal provides a measure of cold working in the stainless steel sample.

BRIEF DESCRIPTION OF THE DRAWINGS

Further understanding of the present invention may best be obtained by consideration of the accompanying drawings wherein:

FIG. 1 is a schematic drawing showing the passage of a stainless steel sample through demagnetizing magnetic fields;

FIG. 2 is a schematic drawing showing the passage of a stainless steel sample through a magnetizing magnetic field;

FIG. 3 is a schematic drawing showing the relative motion between a stainless steel sample and the probes of a magnetometer, and the signal handling structure for effecting the method of the present invention;

FIG. 4 is a representation of a structure for producing relative motion between a stainless-steel sample and the probe of a magnetometer;

FIG. 6 is a graphical illustration of a typical output signal from the filter in FIG. 3;

Figure 5:
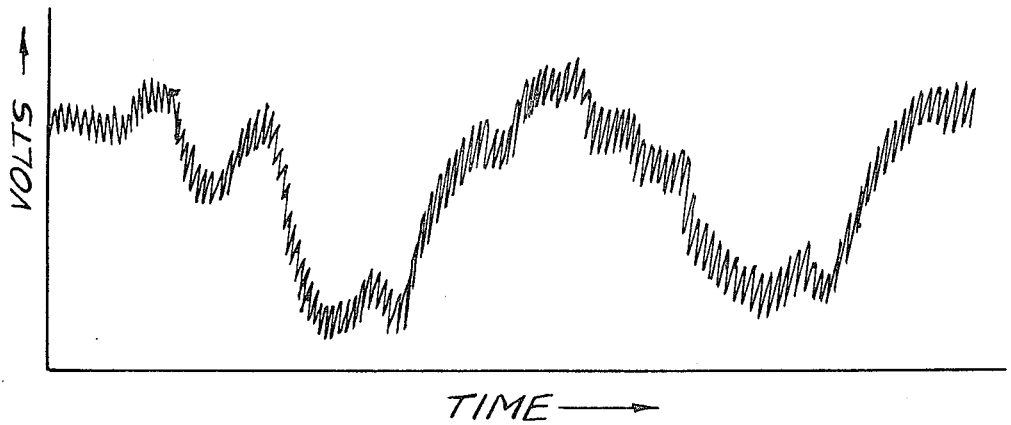
FIG. 5 is a graphical illustration of a typical output signal from the magnetometer in FIG. 3.

Cold working of a stainless steel material has the effect of transforming a small part of the austenite in the stainless steel to martensite. Thus, for a given stainless steel material the more cold working which is effected, the more austenite will be transformed in the material to martensite. Martensite exhibits magnetic properties and the method of the present invention utilizes these magnetic properties by measuring the retentivity of the martensite in stainless steel to provide a measure of cold working in the stainless steel.

In the practice of the method of the present invention, stainless steel whose cold working is being measured is first magnetized in a predetermined direction. A magnetic-field-sensing apparatus is mounted in magnetic coupled relationship with the stainless steel and the stainless steel sample is moved relative to the magnetic-field-sensing apparatus to modulate the magnetic coupling between the apparatus and the stainless steel responsive to the relative motion therebetween and provide a magnetic-field scanning of the stainless steel. The magnetic-field signal sensed by the apparatus is then electrically filtered to pass only the modulation frequency of the magnetic coupling and the value of the filtered sensed magnetic-field signal is measured to provide a measure of cold working in the stainless steel sample.

Further understanding of the present invention may be obtained by considering its application to stainless steel tubing. It is to be appreciated that the present invention is not to be limited to stainless steel tubing but is equally applicable to stainless steel materials having other shapes.

It is preferred in the practice of the present invention that the stainless steel sample whose cold working is to be measured first be demagnetized. This is illustrated in FIG. 1. A strong unidirectional magnetic field is generated between north and south poles 10 and 12 and the stainless steel sample 14 whose cold working is being measured is rotatively translated through the unidirectional magnetic field formed by the poles 10 and 12. The stainless steel sample 14 is also rotatively translated through an alternating field formed by windings 16 through which an a-c current is passed. The strong unidirectional and alternating magnetic fields thereby remove all residual radial and axial magnetic fields from the stainless steel sample 14.

The stainless steel tubing 14 is then linearly translated as shown in FIG. 2 through a strong, unidirectional magnetic field generated by north and south poles 18 and 20. The strong, unidirectional magnetic field between poles 18 and 20 causes the stainless steel sample 14 to be magnetized in a predetermined direction, that is, along a diameter.

A probe 22 of a magnetometer 24 is mounted adjacent the sample 14 so as to be magnetically coupled thereto. A second probe 26 of magnetometer 24 is mounted proximate the probe 22 but in nonmagnetic coupling relationship with the stainless steel sample 14, this is accomplished by reversing the probe 26 relative probe 22 so that the sensing end thereof is furthest from sample 14. The probes 22 and 26 are differentially connected to the magnetometer 24 and, since they are mounted proximate each other, thereby provide compensation for background magnetic field variations. The output from magnetometer 24 is a differential signal of the magnetic fields seen by probes 22 and 26. The stainless steel sample is linearly translated past the magnetically coupled probe 22 while being rotated at a constant rate. This rotative motion of the stainless steel sample 14 causes the magnetometer probe 22 to see a magnetic field which is modulated at the rotative velocity of the material 14.

The output of the magnetometer 24 is amplified by an amplifier 28 and fed to a filter 30. The filter 30 is a conventional filter having electrical characteristics which pass only the frequency of the signal modulation effected by rotation of the stainless steel sample 14. The output from the filter 30 is fed to a conventional demodulator which converts the signal to a d-c voltage level, which may then be recorded by recorder 34 or displayed on a suitable instrument.

It will be understood that the aforedescribed rotational and translational motion of the stainless steel tubing may be accomplished using a lathe-type fixture as shown in FIG. 4. The tubing 14 is rotatively connected via a non-magnetic material 36 to a drive chuck 38. A nonmagnetic support member 40 rotatively supports the connecting nonmagnetic material 36. The probes 22 and 26 of the magnetometer 24 are mounted on a nonmagnetic support member 42 adapted to move along the lathe bed 44. Thus, relative translational and rotational motion between the stainless steel sample 14 and the probe 22 of magnetometer 24 may be obtained.

Figure 7:
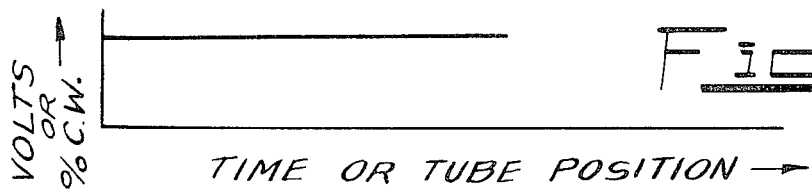
FIG. 7 is a graphical illustration of a typical output signal from the demodulator in FIG. 3.

Typical signals for stainless steel tubing 14 being measured by the aforedescribed method are shown in FIGS. 5, 6 and 7. FIG. 5 is a typical differential output from the magnetometer 24. This signal is generally made up of 60 Hertz hum, noise, drift, and the influence of random changes in the local magnetic field. Superimposed on this signal and hidden by the noise is the modulation signal caused by the rotation of the stainless steel tube 14 as detected by the probe 22 of magnetometer 24. After filtering by filter 30, the typical output signal from filter 30 appears as illustrated in FIG. 6, and after demodulation by demodulator 32, as shown in FIG. 7. The amplitude of the signal in either FIGS. 6 or 7 is directly related to the percent of cold work in the stainless steel tubing 14.

Figure 8:
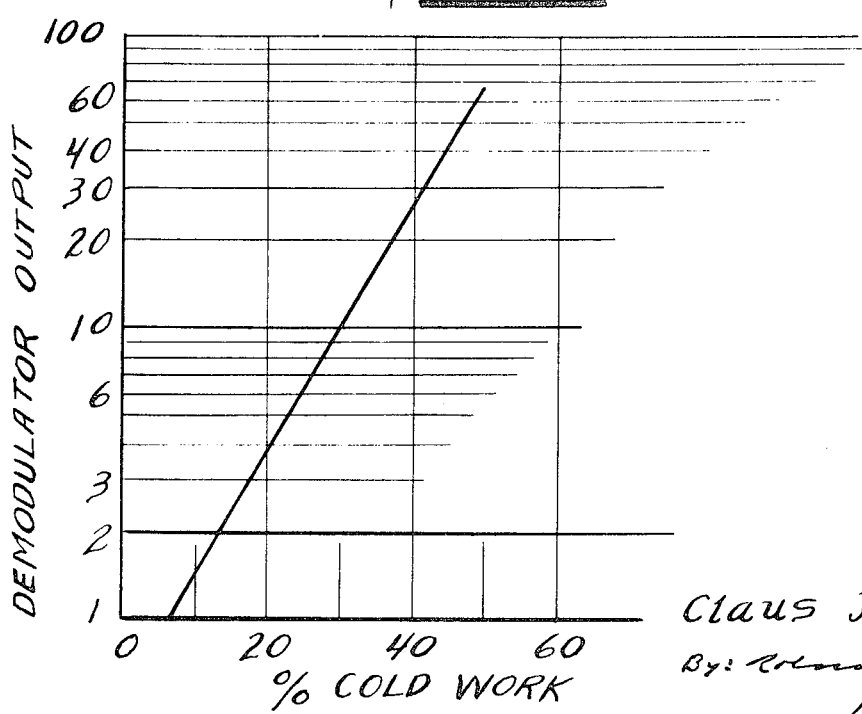
FIG. 8 is a typical plot of the amplitude of the recorded output signal from the demodulator of FIG. 3 as a function of the percent cold work in a sample.

FIG. 8 is a plot of percent cold work and the amplitude of the recorded output signal from demodulator 32 obtained with stainless steel type 316 low carbon tubing having a percent by weight nominal composition of carbon 0.03 max, manganese 2.0 max., silicon 1.0 max., chromiun 16 to 18, nickel 10 to 14, phosphorous 0.045 max., sulphur 0.030 max., molybdenum 2 to 3, and the balance iron. The 316 stainless steel tubing has a 0.250 mil outside diameter and a 0.220 mil inside diameter. Magnetization of the tubing was effected with a 20 kilogauss unidirectional magnetic field and the tubing was rotated at a relative velocity of 10 revolutions per second with respect to the probe 22 of magnetometer 24. Further, the relative linear translational motion of the stainless steel sample 14 and the magnetometer probe 22 was 12 feet per minute.

The method of the present invention is capable of measuring in tubing, as aforedescribed, amounts of cold work down to 5 percent. This measurement may be further appreciated by considering that rotation of a conventional steel desk chain 50 feet away from the probes generates a change in magnetic field, as seen by the probes, approximately an order of magnitude greater than the magnetic field from the aforedescribed stainless steel tubing embodying 20 percent cold working.

With the method of the present invention, cold work measurements can be made quickly and easily. Throughput of work can be at speeds other than that described. For example, with a rotational velocity of 20 revolutions per second, the tubing can be linearly translated at 24 feet per minute. Further, the method of the present invention is relatively insensitive to geometrical alignment of the probe and stainless steel sample, variations in tubing diameter, grain size, ambient temperature, vibration or lift-off between the probe and the sample.

As previously stated, the method of the present invention is not to be limited to tubular shapes but it is applicable to other shapes, such as plates. With such other shapes, the magnetization and direction of relative motion between the probe 22 of magnetometer 24 and the material has to be such that modulation of the magnetic field sensed by the probe 22 is caused by the relative motion therebetween.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above but should be determined only in accordance with the appended claims.

The embodiments of the invention in which an exclusive property or privilege is claimed are defined as follows:

1. A method for measuring the amount of cold working in a stainless steel sample comprising
   magnetizing said stainless steel sample in a predetermined direction,
   mounting a pair of probes of a magnetometer in differential signal-combining relationship with respect to each other,
   magnetically coupling said stainless steel sample to one of said magnetometer probes,
   generating relative motion between said stainless steel sample and said sample-coupled probe to modulate the magnetic coupling between said coupled probe and sample and effect magnetic-field scanning of said sample, filtering the differently combined magnetic-field sensed signal of said magnetometer to selectively accept only the modulation frequency of said magnetic coupling, and measuring the filtered sensed magnetometer signal to provide a measure of cold work in said stainless steel sample.

2. The method according to claim 1 wherein said stainless sample is cylindrical in shape and said magnetizing of said stainless steel sample comprises generating a first magnetic field to provide unidirectional flux lines diametrically through said stainless steel sample, generating a second magnetic field to provide time-varying flux lines axially through said stainless steel sample, generating relative rotational and translational motion between said stainless steel sample and said first and second magnetic fields to effect radial and axial field demagnetization of said stainless steel sample, generating a third magnetic field to provide unidirectional flux lines through said stainless steel sample, and generating relative translational motion between said stainless steel sample and said third magnetic field to provide magnetization of said sample in a predetermined direction.

3. The method according to claim 2 wherein said magnetic-coupling-modulation and sample-scan motion generation comprises generating relative rotational and translational motion between said stainless steel sample and said sample-coupled probe.

4. A method for measuring the amount of cold working in a stainless steel sample comprising magnetizing said stainless steel sample in a predetermined direction, mounting a magnetic-field-sensing apparatus in magnetic coupled relationship with said stainless steel sample, moving said stainless steel sample relative said magnetic-field-sensing apparatus to modulate the magnetic coupling therebetween responsive to said relative motion and provide magnetic-field sensing of said sample, filtering the magnetic-field-signal sensed by said apparatus to pass only the modulation frequency of said magnetic coupling, and measuring the filtered sensed magnetic-field signal to provide a measure of cold working in said stainless steel sample.

* * * * *